US007064924B2

United States Patent
Ju et al.

(10) Patent No.: US 7,064,924 B2
(45) Date of Patent: Jun. 20, 2006

(54) THIN LAMINATED SINGLE POLE PERPENDICULAR WRITE HEAD

(75) Inventors: Kochan Ju, Monte Sereno, CA (US); Lijie Guan, Milpitas, CA (US); Jeiwei Chang, Cupertino, CA (US); Min Li, Fremont, CA (US); Ben Hu, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 195 days.

(21) Appl. No.: 10/610,036

(22) Filed: Jun. 30, 2003

(65) Prior Publication Data

US 2004/0264047 A1   Dec. 30, 2004

(51) Int. Cl.
    *G11B 5/147* (2006.01)
(52) U.S. Cl. ....................................... 360/126
(58) Field of Classification Search ................ 360/125, 360/126, 317
    See application file for complete search history.

(56) References Cited

U.S. PATENT DOCUMENTS

| 5,108,837 A | 4/1992 | Mallary ................... 428/336 |
| 5,621,592 A | 4/1997 | Gill et al. ................ 360/113 |
| 6,255,040 B1 | 7/2001 | Sasaki ..................... 430/320 |
| 6,278,590 B1 | 8/2001 | Gill et al. ................ 360/317 |
| 6,477,007 B1 | 11/2002 | Shukh et al. ............ 360/126 |
| 2003/0076629 A1* | 4/2003 | Minor ..................... 360/126 |
| 2003/0133224 A1* | 7/2003 | Minor et al. ............ 360/125 |
| 2003/0197976 A1* | 10/2003 | Van der Heijden et al. 360/125 |
| 2004/0004786 A1* | 1/2004 | Shukh et al. ............ 360/126 |
| 2004/0066574 A1* | 4/2004 | Crue et al. .............. 360/125 |
| 2004/0201918 A1* | 10/2004 | Guan et al. .............. 360/125 |
| 2004/0252415 A1* | 12/2004 | Shukh et al. ............ 360/317 |

OTHER PUBLICATIONS

TABLE 2.3, Kanu G. Ashar, "Magnetic Disk Drive Technology," IEEE Press, 1996p. 29.*

* cited by examiner

*Primary Examiner*—Tianjie Chen
(74) *Attorney, Agent, or Firm*—Saile Ackerman LLC; Stephen B. Ackerman

(57) ABSTRACT

Single write poles tend to large shape anisotropy which results in a very large remnant field when not actually writing. This has now been eliminated by giving the write pole the form of a three layer laminate in which two ferromagnetic layers are separated by a non-magnetic or antiferromagnetic coupling layer. Strong magnetostatic coupling between the outer layers causes their magnetization directions to automatically be antiparallel to one another, unless overcome by the more powerful write field, leaving the structure with a low net magnetic moment. The thickness of the middle layer must be carefully controlled.

16 Claims, 3 Drawing Sheets

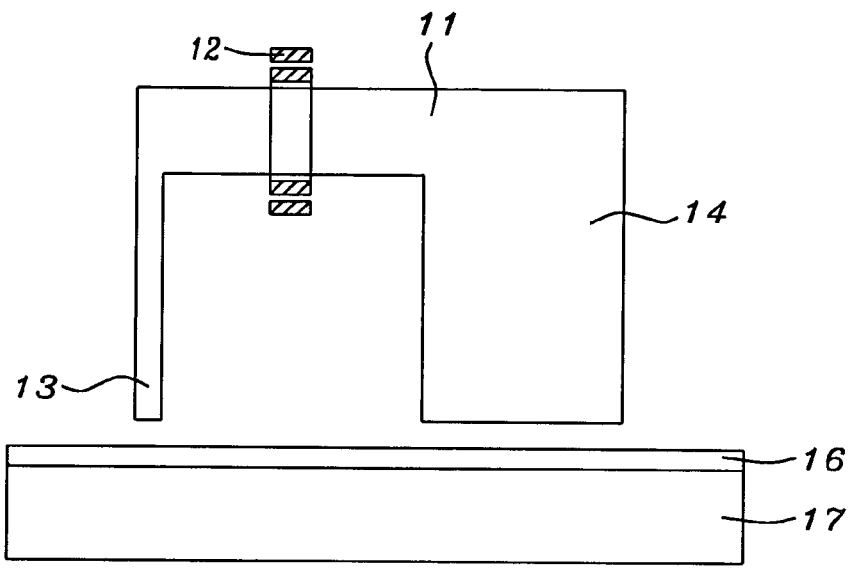
FIG. 1 – Prior Art
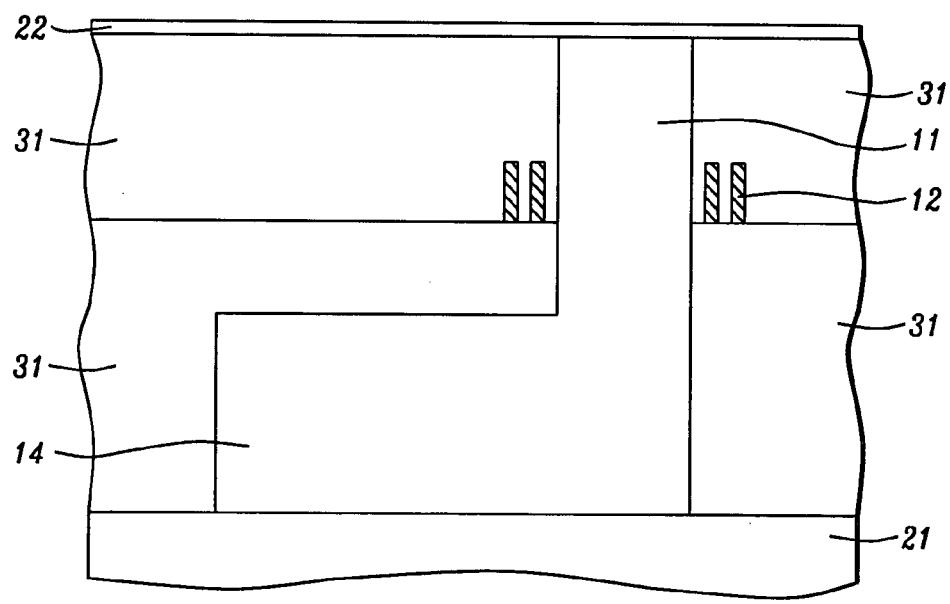
FIG. 2

THIN LAMINATED SINGLE POLE PERPENDICULAR WRITE HEAD

FIELD OF THE INVENTION

The invention relates to the general field of magnetic disk systems with particular reference to magnetic write heads for perpendicular designs, more specifically to remnant field reduction in single pole heads.

BACKGROUND OF THE INVENTION

Perpendicular magnetic recording (PMR) is important for the future of the magnetic recording industry because it offers higher areal density than the current longitudinal magnetic recording (LMR). This is due to the fact that the PMR medium is thermally more stable than that used for LMR. At present, LMR has achieved over 100 Gigabits per square inch (Gbpsi) in the laboratory and more than 60 Gpsi in products currently offered at the market place. In order to further extend the LMR recording density, two main obstacles have to be overcome. The first one is the thermal stability of the LMR recording media which arises because its thickness has to decrease to the extent that thermal energy could randomize the recorded bits. The second one is the ongoing increase in the write field needed to record on the high coercivity LMR media.

This high coercivity is needed to achieve high bit resolution and good thermal stability. Both obstacles to LMR would be considerably lowered if PMR were deployed instead. Thicker PMR media with a magnetically soft underlayer film (SUL) could be used to alleviate the thermal stability problem. A PMR writer provides a larger write field than that of LMR, which is limited to the fringe field from its write gap.

An example of a perpendicular writer of the prior art is shown in FIG. 1. Magnetic yoke 11 is surrounded by write coil 12 and includes main pole 13 that terminates as a write pole tip at the recording surface. Return pole 14 conveys the magnetic flux generated by coil 12 down to a short distance from the recording surface. The flux passes from write pole 13 through recording layer 16, into SUL 17, and then back up into return pole 14

Currently, the single pole is usually made of high Bs (saturation flux density—measured in Teslas) material, with values >2T, and has very small dimensions (0.1 μm in width and 0.2 μm in thickness) together with a relatively long yoke. As a result, the single pole has very large shape anisotropy. After the writing process, the remnant field from a single pole can be very large (as high as 2 kOe), which usually causes erasure of written bits. This problem will get more severe with further decreases in device dimensions.

A routine search of the prior art was performed with the following references of interest being found:

In U.S. Pat. No. 5,477,007, Shukh et al describe a top pole having a laminated structure. In U.S. Pat. No. 6,278,590 Gill et al disclose a laminated pole. U.S. Pat. No. 6,396,735 (Michijima et al) shows a laminated memory element. Sasaki teaches that a top pole may be laminated of two or more materials in U.S. Pat. No. 6,255,040. In U.S. Pat. No. 5,621,592, Gill et al disclose a laminated Fe-based/NiMn structure for a write pole while Mallary shows a vertically laminated pole in U.S. Pat. No. 5,108,837. Note that all these references relate to LMR and are not applicable to perpendicular recording systems in the forms and dimensions described.

SUMMARY OF THE INVENTION

It has been an object of at least one embodiment of the present invention to provide a magnetic writer suitable for vertical recording.

Another object of at least one embodiment of the present invention has been that the write pole of said writer exhibit low remnant magnetization when not in use.

Still another object of at least one embodiment of the present invention has been that said write pole provide a high write field as well as a low remnant magnetization.

A further object of at least one embodiment of the present invention has been that manufacture of said write pole introduce no significant changes to existing processes for manufacturing the writer.

These Objects have been achieved by giving the write pole the form of a three-layer laminate in which two ferromagnetic layers are separated by an anti-ferromagnetic coupling layer or by a non-magnetic layer. If an antiferromagnetic coupling layer is used, its thickness is chosen to be optimum for antiferromagnetic coupling. In the remanent state (no external driving field), the two laminated ferromagnetic layers will stay antiparallel to each other so as to minimize the interlayer exchange coupling energy and to allow as much magnetic flux closure as possible, leaving the structure with a low net magnetic moment. For the non-magnetic layer, its thickness is chosen so that there can be no ferromagnetic exchange coupling between the ferromagnetic layers, in which case the low net magnetic moment is achieved solely through magnetic flux closure.

BRIEF DESCRIPTION OF THE DRAWINGS

FIG. 1 shows a vertical magnetic writer of the prior art.

FIG. 2 is the starting point for the method of the present invention, including the first layer of a three layer laminated write pole.

DESCRIPTION OF THE PREFERRED EMBODIMENTS

Figure 3:
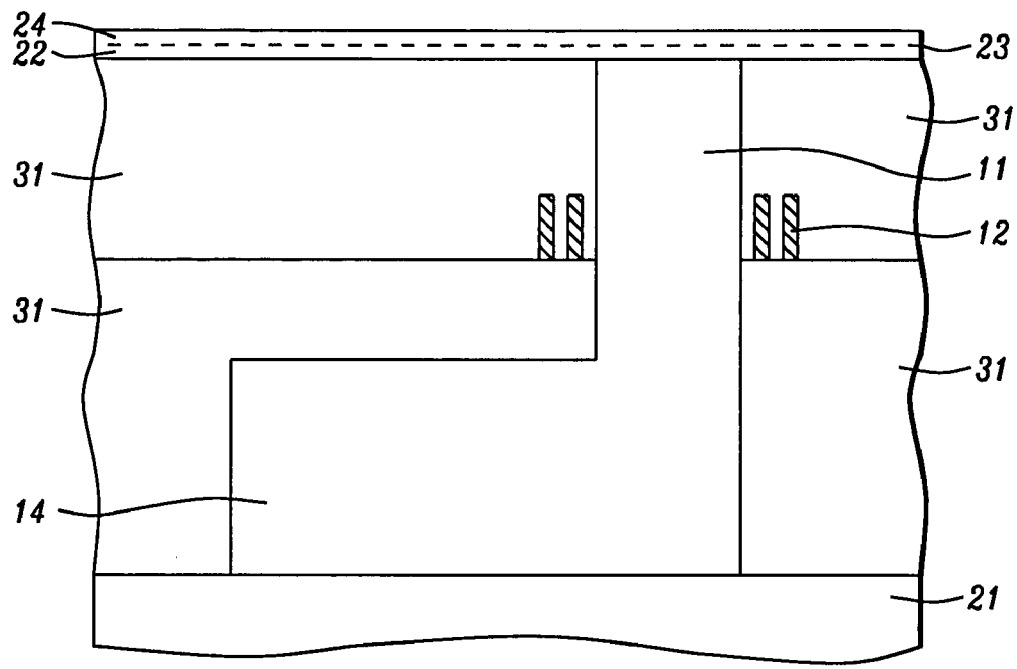
FIGS. 3 and 4 illustrate additional steps in forming the write pole.

We will disclose the present invention by providing a description of a method for generating it, thereby making the structure of the invention apparent as well. Referring now to FIG. 2, the method begins with the provision of magnetic yoke 11 which had previously been deposited and patterned on return pole 14 which is shown in contact with substrate 21 (commonly a magnetic shield).

Conductive coil 12 is also formed so that it surrounds yoke 11. The various incidences of layer 31 that appear in the figure represent insulating, non-magnetic material that serves to provide mechanical integrity to the structure.

Normally, the next step would be to deposit the full thickness of the write pole. However, in a departure from the prior art, a first (lower) layer of ferromagnetic material 22 is deposited onto the topmost surface of 31 as well as onto the exposed surface of yoke 11, giving the structure, at this stage, the appearance seen in FIG. 2. For lower ferromagnetic layer 22 we have preferred to use FeCo but other similar materials, such as CoNiFe, FeCoZrO, or any alloy of Fe and/or Co and/or Ni that has a high $B_S$ value could be substituted. Ferromagnetic layer 22 is deposited to a thickness between about 500 and 2,000 Angstroms.

Now follows a key novel feature of the invention. As seen in FIG. 3, layer 23 is next deposited directly onto layer 22, followed by the deposition onto itself of a second ferromagnetic layer 24. There are two possible choices for layer 23 (representing two different embodiments of the invention):

(1) layer 23 is an antiferromagnetic coupling material. In this case, Its thickness is carefully chosen as needed for an effective antiferromagnetic coupling between layers 22 and 24. A wide range of antiferromagnetic coupling materials is available, including Ru, Rh, and Ir, but the choice of thickness will depend on which one is selected. For example, if the antiferromagnetic coupling layer is Ru it will need to be deposited to a thickness between about 3 and 10 Angstroms while if it is Rh it will need to be deposited to a thickness between about 4 and 7 Angstroms.

(2) layer 23 is a non-magnetic material such as Ta, NiCr, Cu, or $Al_2O_3$, with NiCr being preferred. Its thickness is between about 5 and 50 Angstroms which is carefully chosen to be just thick enough to prevent any exchange coupling between layers 22 and 24 but still thin enough to allow strong magnetostatic coupling between layers 22 and 24. As a result, these two layers will automatically orient themselves so as to be magnetically antiparallel to one another when no external field is present. However, in the presence of a strong external field, both layers will align themselves in the same direction and act as a single unit.

Note that, as a further refinement, the coupling field between layers 22 and 24 can be adjusted by insertion of a lower coercivity layer at the antiferromagnetic-ferromagnetic interface. For example, if layers 22 and 24 are of CoFe, an adjusting layer of NiFe could be used (see examples c, d, e, and f below).

After the deposition of one or other of the two versions of layer 23, upper ferromagnetic layer 24 is laid down to a thickness between about 500 and 2,000 Angstroms. Suitable materials for layer 24 include CoNiFe, FeCo, and other high $B_S$ alloys of Fe, Co, and Ni, with FeCo being preferred. Preferably, but not critically, layers 22 and 24 will have the same thickness and be of the same material.

Figure 4:
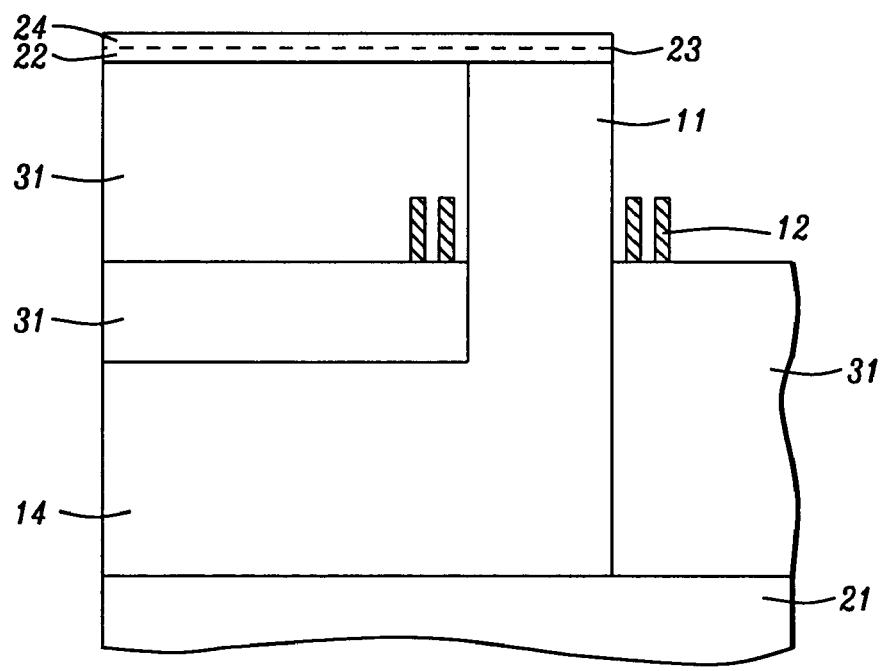
Figure 5:
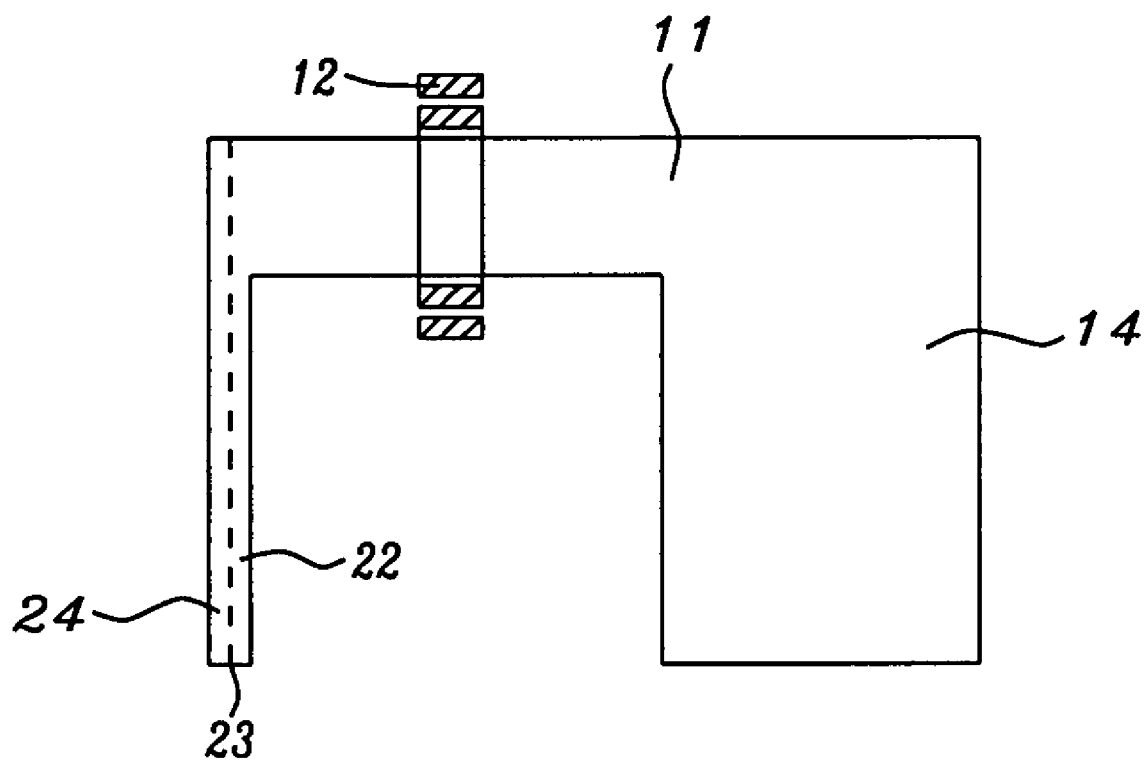
FIG. 5 shows the completed device.

Moving on to FIG. 4, with the laminate of layers 22-23-24 in place, formation of the device is completed by patterning these three layers together to form a laminated write pole that extends from yoke 11 in the same direction as return pole 14, terminating at a surface that is coplanar with the corresponding surface of the return pole, giving the completed device the appearance illustrated in FIG. 5.

We have determined that, provided the materials and thickness ranges are as disclosed above, the resulting laminated write poles have residual fluxes density that are less than about 0.1 T, while at the same time being able to provide a write field of at least 10 kOe.

We list below several examples of the laminate structure including addition of NiFe for fine adjustment (thicknesses in Angstroms):

a. COFe1000/RU3/CoFe1000
b. CoFe1000/Rh6/CoFe1000
c. CoFe1000/Ru3/NiFe2–4/CoFe1000
d. CoFe1000/NiFe2–4/Ru3/NiFe2–4/CoFe1000
e. CoFe1000/Rh6/NiFe2–4/CoFe1000
f. CoFe1000/NiFe2–4/Rh6/NiFe2–4/CoFe1000

What is claimed is:

1. A method to manufacture a perpendicular magnetic writer, comprising:
   providing a magnetic yoke having a bottom surface and an exposed top surface, said bottom surface being magnetically connected to a return pole;
   providing a conductive coil that surrounds said yoke;
   depositing a lower layer of ferromagnetic material onto an area that includes said front surface;
   depositing a layer of non-magnetic material on said lower layer;
   depositing an upper ferromagnetic layer on said layer of non-magnetic material whereby there is no exchange coupling between said upper and lower ferromagnetic layers;
   patterning said upper and lower ferromagnetic layers, as well as said non-magnetic layer, to form a laminated write pole that extends from said yoke in the same direction as the return pole and that has a bottom surface that is coplanar with that of said return pole; and
   thereby causing said laminated write pole to have a residual flux density that is less than about 0.1 T.

2. The method described in claim 1 wherein said lower ferromagnetic layer is selected from the group consisting of FeCo, CoNiFe, and any alloy containing Co, Fe, or Ni and having a high Bs value.

3. The method described in claim 1 wherein said lower ferromagnetic layer is deposited to a thickness between about 500 and 2,000 Angstroms.

4. The method described in claim 1 wherein said upper ferromagnetic layer is selected from the group consisting of FeCo, CoNiFe, and any alloy containing Co, Fe, or Ni and having a high Bs value.

5. The method described in claim 1 wherein said upper ferromagnetic layer is deposited to a thickness between about 500 and 2,000 Angstroms.

6. The method described in claim 1 wherein said non-magnetic layer is Ta, NiCr, Cu, or $Al_2O_3$.

7. The method described in claim 1 wherein said non-magnetic layer is deposited to a thickness between about 16 and 50 Angstroms.

8. The method described in claim 1 wherein said laminated write pole can provide a write field of at least 10 kOe.

9. A perpendicular magnetic writer, comprising:
   a magnetic yoke having first and second ends, said second end being magnetically connected to a return pole that extends away from said yoke in a direction;
   a conductive coil that surrounds said yoke;
   a write pole that extends from said yoke's first end in the same direction as the return pole and that has a bottom surface that is coplanar with that of said return pole;

said write pole being a laminate of upper and lower ferromagnetic layers separated by a layer of non-magnetic material, there being no other layers in said laminate;

there being no exchange coupling between said upper and lower ferromagnetic layers; and said laminated write pole having a residual flux density that is less than about 0.1 T.

10. The magnetic writer described in claim 9 wherein said lower ferromagnetic layer is selected from the group consisting of FeCo, CoNiFe, and any alloy containing Co, Fe, or Ni and having a high Bs value.

11. The magnetic writer described in claim 9 wherein said lower ferromagnetic layer has a thickness between about 500 and 2,000 Angstroms.

12. The magnetic writer described in claim 9 wherein said upper ferromagnetic layer is selected from the group consisting of FeCo, CoNiFe, and any alloy containing Co, Fe, or Ni and having a high Bs value.

13. The magnetic writer described in claim 9 wherein said upper ferromagnetic layer has a thickness between about 500 and 2,000 Angstroms.

14. The magnetic writer described in claim 9 wherein said non-magnetic layer is Ta, NiCr, Cu, or $Al_2O_3$.

15. The magnetic writer described in claim 9 wherein said non-magnetic layer has a thickness between about 16 and 50 Angstroms.

16. The magnetic writer described in claim 9 wherein said laminated write pole provides a write field of at least 10 kOe.

* * * * *